United States Patent [19]

Lane

[11] Patent Number: 5,623,552
[45] Date of Patent: Apr. 22, 1997

[54] SELF-AUTHENTICATING IDENTIFICATION CARD WITH FINGERPRINT IDENTIFICATION

[75] Inventor: William F. Lane, Wilson, N.C.

[73] Assignee: CardGuard International, Inc., Wilson, N.C.

[21] Appl. No.: 515,151

[22] Filed: Aug. 15, 1995

Related U.S. Application Data

[63] Continuation of Ser. No. 184,686, Jan. 21, 1994, abandoned.

[51] Int. Cl.$^6$ ........................................... G06K 9/00
[52] U.S. Cl. ................. 382/124; 340/825.34; 235/492
[58] Field of Search ........................... 382/124; 235/380, 235/492; 902/3, 4, 5; 340/825.34

[56] References Cited

U.S. PATENT DOCUMENTS

| 3,673,331 | 6/1972 | Hair et al. | 179/15 B |
|---|---|---|---|
| 3,812,461 | 5/1974 | Lemelson | 340/149 A |
| 3,940,795 | 2/1976 | Lemelson | 360/101 |
| 4,202,120 | 5/1980 | Engel | 356/71 |
| 4,253,086 | 2/1981 | Szwarcbier | 356/71 |
| 4,256,955 | 3/1981 | Giraud et al. | 235/380 |
| 4,353,056 | 10/1982 | Tsikos | 340/146.3 E |
| 4,455,083 | 6/1984 | Elmes | 356/71 |
| 4,471,343 | 9/1984 | Lemelson | 340/571 |
| 4,575,621 | 3/1986 | Dreifus | 235/380 |
| 4,582,985 | 4/1986 | Löfberg | 340/825.34 |
| 4,614,861 | 9/1986 | Pavlov et al. | 235/380 |
| 4,667,087 | 5/1987 | Quitana | 235/380 |
| 4,677,657 | 6/1987 | Nagata et al. | 340/825.34 |
| 4,760,245 | 7/1988 | Fukaya | 235/379 |
| 4,782,455 | 11/1988 | Morinouchi et al. | 235/380 |
| 4,802,218 | 1/1989 | Wright et al. | 380/23 |
| 4,864,115 | 9/1989 | Imran et al. | 235/492 |
| 4,926,325 | 5/1990 | Benton et al. | 364/408 |
| 4,983,036 | 1/1991 | Froelich | 356/71 |
| 4,995,086 | 2/1991 | Lilley et al. | 340/825.34 |
| 5,321,765 | 6/1994 | Costello | 382/4 |

FOREIGN PATENT DOCUMENTS

0313288  12/1988  Japan .......................................... 902/3

Primary Examiner—Jose L. Couso
Assistant Examiner—Anh Hong Do
Attorney, Agent, or Firm—Bell, Seltzer, Park & Gibson

[57] ABSTRACT

A self-authenticating identification card includes a fingerprint sensor for authenticating the identity of a user. An ID card memory permanently stores information related to a fingerprint of the card user. An on-card authenticator compares information related to a sensed fingerprint with the stored fingerprint information and produces an authentication signal if the sensed fingerprint information matches the stored fingerprint information. An audio generator is preferably included in the card for transmitting a predetermined audio signal to a speaker if a match is sensed. A second memory, in the form of a programmable magnetic stripe, may be included on the card for storing account information related to the card user. A magnetic stripe programmer is then used for loading predetermined account information into the programmable magnetic stripe if the sensed fingerprint information matches the stored fingerprint information. Account information is automatically cleared from the programmable magnetic stripe after a predetermined elapsed time.

29 Claims, 11 Drawing Sheets

SELF-AUTHENTICATING IDENTIFICATION CARD WITH FINGERPRINT IDENTIFICATION

This application is a continuation of application Ser. No. 08/184,686, filed Jan. 21, 1994, now abandoned.

FIELD OF THE INVENTION

This invention relates to the field of identification cards, and more particularly to a self-authenticating identification card.

BACKGROUND OF THE INVENTION

Proving one's identity is necessary for a variety of reasons. Drivers licenses, social security cards, employee identification cards, and credit cards are all designed for particular Uses. In many instances, however, multiple forms of identification are necessary. For example, when cashing a check, one may be required to show a drivers license and a major credit card. Multiple ID requirements illustrate the nature of a significant problem, identification cards as a whole are not always trustworthy. Unfortunately, picture bearing identification cards are only as effective as the picture they bear. An identification card may be rejected and prove itself useless, if one grows a full beard, otherwise changes a hair style, loses weight, gains weight, etc.

In addition, many identification cards have no picture or other authentication means. For most cards without a picture, merely bearing and presenting the card is identification enough. However, identification cards of this type are woefully inadequate. The credit card industry, for example, loses tens of millions of dollars every year in credit card fraud. Thieves wreak havoc when credit cards, welfare cards, or other account bearing cards are stolen.

It is known to use fingerprints in conjunction with an identification card to verify ownership of the card at the point of said. For example, U.S. Pat. No. 4,253,086 to Szwarcbier discloses a credit card having a fingerprint stored thereon for later verification that the holder is indeed the true owner of the card. The fingerprint may be recorded using mechanical steps wherein the fingerprint is first taken using a stamp pad and paper. The image is then enlarged, retraced to form clean lines, reduced to its normal size, and stored On the identification card, preferably in mirror reverse form. A fresh print is compared to the stored master print using a viewer projector, episcope, or computer.

U.S. Pat. No. 4,575,621 to Dreifus discloses an identification card having a programmable data processor, a fixed memory to store various information, and light emitting diodes (LEDs) for optically communicating with a corresponding terminal. The memory may include retinal patterns or fingerprints for comparison to user characteristics by a terminal at the point of sale.

U.S. Pat. No. 4,983,036 to Froelich discloses a "smart" credit card which may include the complete records of an individual's bank balance, and their transactions, so that a merchant can confirm a balance based on the information stored on the card itself. The card includes a fingerprint exemplar which is compared with a print taken on a treated paper carrier. The two images are optically compared in a reader using autocorrelation to confirm a match.

The above cited references using fingerprint identification need to operate in conjunction with some form of separate fingerprint scanner. Separate scanners, and the knowledge to operate them, dramatically increase the costs and complexity associated with an identification card system. In addition, security can still be breached, either by scanning a magnetic stripe or recording the account information printed on the card. Thus, even with identity proving features, many credit cards may still be used fraudulently over the telephone or for other electronic purchases.

SUMMARY OF THE INVENTION

It is therefore an object of the present invention to provide an identification card which does not require external equipment for identity verification.

It is another object of the present invention to provide an identification card that can protect account information.

These and other objects according to the invention are provided by a self-authenticating identification card which allows the card itself to authenticate the identity of the user. The card includes a fingerprint sensor for authenticating the identity of a user. An ID card memory permanently stores information related to a fingerprint of the card user. Preferably, an activator is electrically connected to the fingerprint sensor and the memory for initiating the storage of information related to a fingerprint in the card memory. A verification device on the card may then indicate that the fingerprint information has been successfully stored in the memory. In an alternative embodiment, the memory can be preloaded with a user's fingerprint information.

A self-authenticating identification card also preferably contains an authenticator, electrically connected to the fingerpaint sensor and the memory, for comparing information related to a sensed fingerprint from the on-card fingerprint sensor, with the stored fingerprint information, and for producing an authentication signal if the sensed fingerprint information matches the stored fingerprint information.

The identification card may include a visual display, responsive to the verification device, for visually indicating that the information related to a fingerprint has been successfully stored in the memory. The visual display may also be responsive to the authentication signal for indicating that the sensed fingerprint information matches the stored fingerprint information.

A speaker may also be included, responsive to the verification device, for audibly indicating that the fingerprint information of the ID card user has been successfully stored in the memory. The speaker is also preferably responsive to the authentication signal for indicating that the sensed fingerprint information matches the stored fingerprint information. An audio generator is preferably included in the card for transmitting a predetermined audio signal to the speaker if the sensed fingerprint information matches the stored fingerprint information.

A second memory, preferably in the form of a programmable magnetic stripe, may be included on the card for storing account information related to the card user. A magnetic stripe programmer is then used for loading predetermined account information into the programmable magnetic stripe if the sensed fingerprint information matches the stored fingerprint information. A clearing circuit is preferably included for automatically clearing account information from the programmable magnetic stripe after a predetermined elapsed time.

The invention permits the permanent encoding of one's fingerprint onto an identification card in an uncomplicated fashion. At a subsequent point in time, the card can recognize the stored fingerprint in order to ensure that only a rightful holder uses the card. Only upon the production of an authentication signal will the preferred card load account information into the card's programmable magnetic stripe. Any other fingerprint will fail in an attempt to obtain a verification or authentication signal. Thus, positive identification with one identification card is now available. In addition, the same card protects valuable account information.

An identification card authorization device, for use with a self-authenticating ID card according to the invention, includes a magnetic stripe reader, an audio receiver, and a transmitter. The magnetic stripe reader scans the magnetic stripe of an identification card and generates a magnetic stripe signal. The audio receiver receives an audio signal from the speaker of an identification card. The transmitter is electrically connected to the magnetic stripe reader and the audio receiver for transmitting both the magnetic stripe signal and the audio signal to an approval center, typically over telephone lines. The authorization device preferably includes a user input device for entering a transaction amount. The transmitter is also responsive to the user input for transmitting a transaction amount to the approval center with the magnetic stripe signal and the audio signal. The authorization device may also include a receiver for receiving a verification signal from an approval center and an indicator for signifying that an identification card has been approved for a transaction.

An approval system, for approving a transaction involving a self-authenticating ID card, includes a central approval center and an identification card authorization device, as described herein. The central approval center includes an approval system for receiving signals from a card authorization device and for approving transactions. Thus, the approval system transmits an authorization signal to the authorization device upon authorization.

Accordingly, a preferred method of using an identification card includes the steps of sensing information related to a fingerprint which is impressed upon the identification card, electronically storing information related to the sensed fingerprint, and producing a verification signal indicating that the sensed fingerprint information has been successfully electronically stored. The step of producing a verification signal may include displaying a visual verification signal or generating an audible verification signal.

After a user stores fingerprint information, or if fingerprint information has been preloaded into the card memory, a preferred method of self-authentication includes the steps of sensing information related to a fingerprint which is impressed upon the identification card, comparing the sensed fingerprint information with the electronically stored fingerprint information, and producing an authentication signal if the information related to the sensed fingerprint matches the electronically stored fingerprint information. The step of producing an authentication signal may include displaying a visual authentication signal or generating an audible authentication signal. An audible authentication signal may be a predetermined coded audio signal.

If the identification card includes a programmable magnetic stripe, then the authentication signal is preferably followed by the step of loading predetermined account information into the programmable magnetic stripe. The account information is later cleared from the magnetic stripe after a predetermined elapsed time to prevent unauthorized use.

The authorization device senses magnetic stripe data and audio signals from a self-authenticating ID card. The authorization device then transmits the sensed data to an approval center. The approval center may then transmit an approval signal for a transaction to the authorization device, upon approval of the transaction.

The identification card and the associated approval system thus protects the individual card holder, any sales establishment, and the organization which sponsors the card. Card holders would have no interest in retaining their card if approached by a thief, and thieves would have less motivation to practice their trade if they knew the results of their work would likely be for naught. For their part, stores and credit companies would finally have a stable mode of compensation for their goods and services. Accordingly, security of accurate identification and the protection of account information is profoundly increased.

DESCRIPTION OF PREFERRED EMBODIMENTS

The present invention will now be described more fully hereinafter with reference to the accompanying drawings, in which preferred embodiments of the invention are shown. Although the term "identification card" is used throughout the specification, this term is meant to include both cards whose purpose is purely identification, such as drivers licenses, and diverse other cards used for additional purposes as well, such as credit cards. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1A:
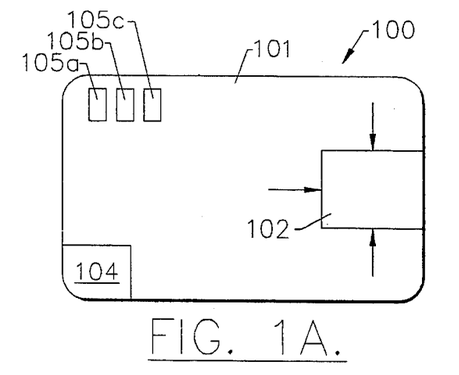
FIGS. 1A & 1B illustrate top and bottom views of a self-authenticating identification card according to the invention.
Figure 1B:
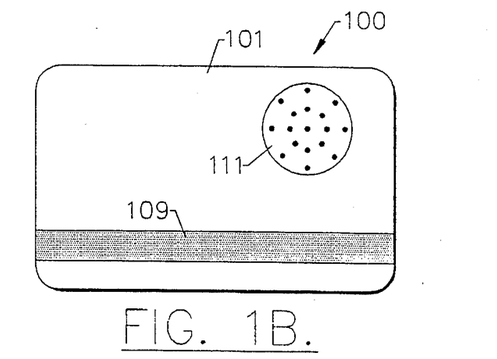
Figure 2:
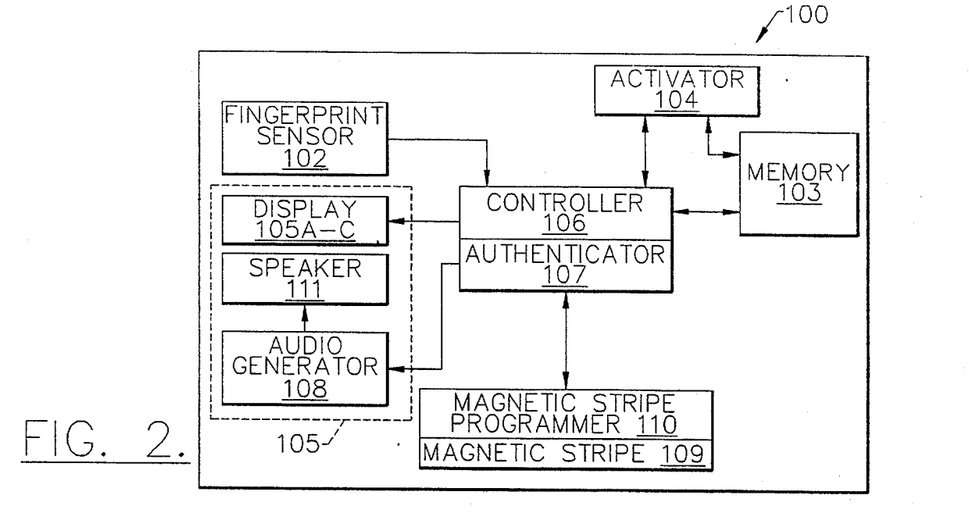
FIG. 2 illustrates a block diagram of a self-authenticating ID card according to the invention.
Figure 4:
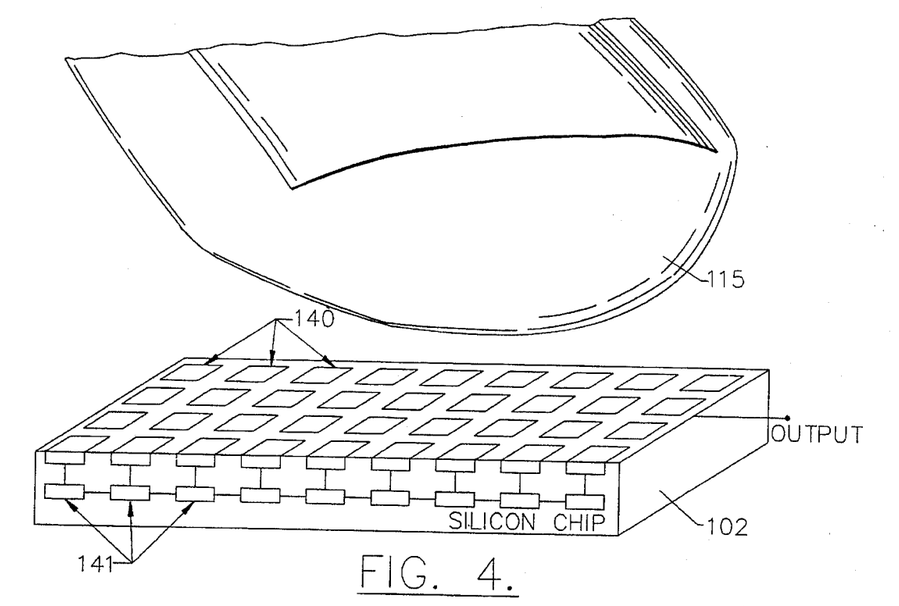
FIG. 4 illustrates a fingerprint sensor for the identification card of FIG. 1.

An identification card according to the invention, referred to generally by 100, is illustrated in FIGS. 1A & 1B and FIG. 2. A card body, or substrate 101, carries a fingerprint sensor 102 and a memory 103 for storing information related to a fingerprint of the card user. As shown in FIG. 4, the fingerprint sensor 102 senses information related to a fingerprint using a multitude of small capacitors to detect the ridges and valleys of a fingerprint. One sensor of this type is disclosed in U.S. Pat. No. 4,353,056 to Tsikos, the disclosure of which is incorporated in its entirety herein by reference. The operation of the fingerprint sensor 102 is discussed in greater detail below. The memory 103 is contained within the substrate 101 and is electrically connected to the fingerprint sensor 102. An embedded flat battery (not shown) supplies power to the card.

An activator 104 is electrically connected to the fingerprint sensor 102 and the memory 103 for initiating fingerprint information storage upon activation thereof. The activator 104 may be a separate pressure sensitive pad, as shown in FIG. 1A, or it may be incorporated in the fingerprint sensor 102, so that placing a finger 115 on the fingerprint sensor 102 triggers the identification card 100. A verification device 105 is electrically connected to the memory 103, as shown in FIG. 2, for indicating that the information related to a fingerprint has been successfully stored in the memory 103. The verification device 105 may include a visual display 105A, such as a yellow LED. The verification device may also include a speaker 111 for audibly indicating, i.e. with a simple tone, that the information related to a fingerprint of the identification card user has been successfully stored in the memory 103.

An authenticator 107 is electrically connected to the fingerprint sensor 102 and the memory 103 for comparing information related to a sensed fingerprint with the stored fingerprint information and for producing an authentication signal if the sensed fingerprint information matches the stored fingerprint information. The authenticator 107 may be triggered by the card activator 104, a separate switching mechanism (not shown), pressure on the fingerprint sensor 102, or other triggers well known to those having skill in the art. Controller 106 controls operations of the card as will be described below.

The verification device 105 may be responsive to the authentication signal for visually indicating that the sensed fingerprint information matches the stored fingerprint information, for example with a green LED 105B. Similarly, the speaker 111 may be responsive to the authentication signal for audibly indicating that the sensed fingerprint information matches the stored fingerprint information. In some applications, it may be desirable for an audio generator 108 to be electrically coupled to the speaker 111 and responsive to the authentication signal for transmitting a predetermined audio signal to the speaker 111 if a match occurs. A coded audio signal may be one way to transmit a security code or account information.

For credit-type cards, a second memory, preferably in the form of a magnetic stripe 109, may be carried by the substrate 101 for storing account information related to the card user. In some applications, a standard magnetic stripe with permanently encrypted account information may be quite satisfactory. However, a preferred credit card according to the invention uses a programmable magnetic stripe 109. Accordingly, a magnetic stripe programmer 110, coupled to the programmable magnetic stripe 109 and responsive to the authentication signal, is used for loading predetermined account information into the programmable magnetic stripe 109 if the sensed fingerprint information matches the stored fingerprint information. A preferred magnetic stripe programmer 110 includes a clearing circuit for automatically clearing account information from the programmable magnetic stripe 109 after a predetermined elapsed time so that unauthorized use of the card 100 is prevented.

Figure 3:
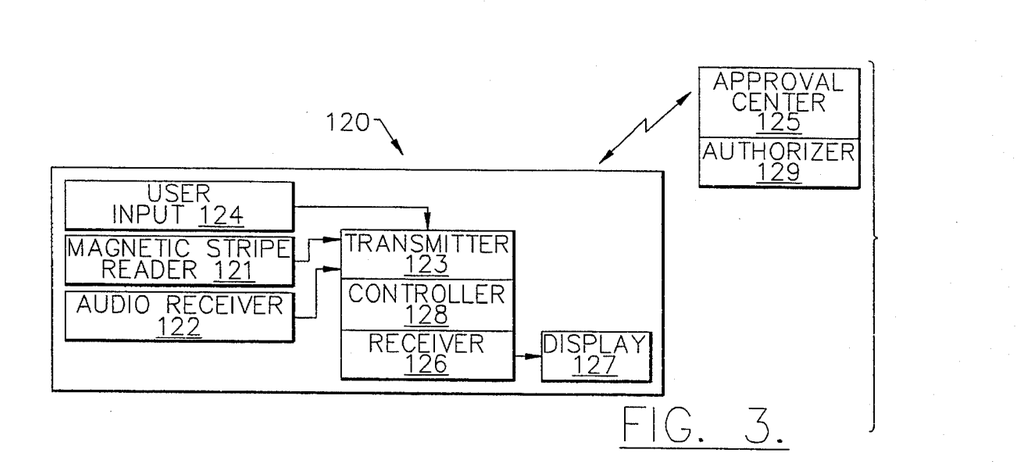
FIG. 3 illustrates an identification card authorization device and an approval center according to the invention.

Referring now to FIG. 3, an identification card authorization device 120 is illustrated for use with the self-authenticating ID card 100 of FIGS. 1 and 2. The authorization device 120 includes a magnetic stripe reader 121 for scanning the magnetic stripe 109 of a self-authenticating ID card 100 and for generating a magnetic stripe signal. The authorization device also includes an audio receiver 122 (microphone) for receiving an audio signal from the speaker 111 of the identification card 100. A transmitter 123 is electrically connected to the magnetic stripe reader 121 and the audio receiver 122 for transmitting both the magnetic stripe signal and the audio signal to an approval center 125. Operations of the authorization device 120 are controlled by a controller 128.

An identification card authorization device 120 may also include a user input device 124, such as a keypad, for entering a transaction amount. The transmitter 123 is responsive to the user input device 124 for transmitting a transaction amount to the approval center 125 along with the magnetic stripe signal and the audio signal. A receiver 126, for receiving a verification signal from the approval center 125, and a display 127, for indicating that a card 100 has been approved for a transaction, are also preferably included in the authorization device 120.

A central approval center 125 includes an approval mechanism for receiving signals and for approving transactions. More specifically, an approval center 125 incorporates an authorizer 129 for transmitting an authorization signal to the authorization device 120. The authorizer 129 may transmit its signals over standard telephone lines or use RF transmissions.

Referring now to FIG. 4, the fingerprint sensor 102 of FIG. 1, will now be described in detail. Most fingerprint sensors based on current technologies use optical scanning of the fingerprint. Typically, the digitized image of an optically scanned print is compared to a stored fingerprint to determine whether there is a match. Fingerprint sensor 102 is a single chip based on electronic detection of the fingerprint, and does not require a large and expensive optical scanning system. A finger 115 is pressed against the surface of the fingerprint sensor 102, which directly measures the contours of the fingerprint by sensing the dielectric properties of the skin, as shown in FIG. 4.

Fingerprint experts identify fingerprints by "large scale" features such as "whorls" and "loops." The fingerprint sensor 102 compares fingerprints by correlation of "fine-grained" fingerprint detail and is designed to have an identification error probability of 1 in 50,000. The fingerprint sensor surface is composed of an array of small ridge detectors 140 that can determine whether the skin surface directly over the detector 140 is a ridge or a valley.

Figure 5:
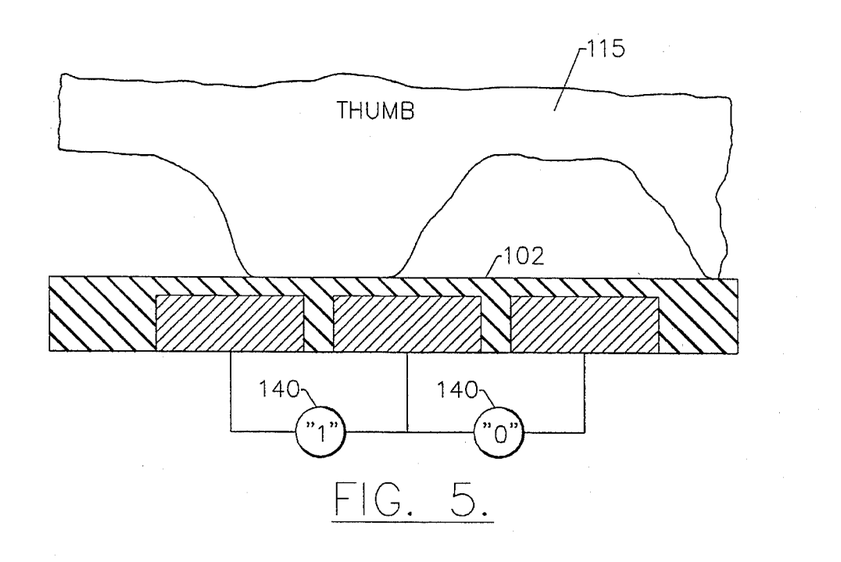
FIG. 5 illustrates fingerprint ridge detectors for the fingerprint sensor of FIG. 4.

One embodiment of a sensor 102 can be created by forming an array of flat metallic plates with capacitance meters connected between each pair of plates. Because of the high dielectric constant of moisture contained in the skin, the "fringing" capacitance increases in the regions covered by a ridge in the skin. Detection of a threshold capacitance level can form a binary image of the fingerprint in contact with the array. FIG. 5 illustrates the detection of a ridge by one of the ridge detectors 140. A more sensitive version of two fringing capacitor plates may be formed by interdigitated fingers.

A fingerprint sensor 102 as disclosed herein can be fabricated by well known thin film deposition and patterning techniques. Simulations of such a sensor, assuming a mean dielectric constant of skin=10, show that ridges will produce a capacitance of 0.12 pf while valleys will produce a capacitance of 0.03 pf. A two dimensional array of such ridge detectors 140 can produce a two dimensional binary image of the ridge pattern in the fingerprint.

Figure 6:
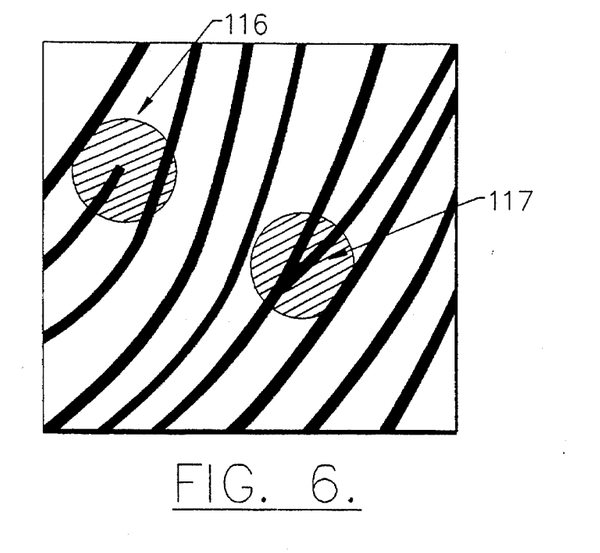
FIG. 6 illustrates "line endings" and "branches" of a fingerprint.

The data collected by the detectors 140 forms an electronic "image" of the ridges and valleys of the print. The locations of fingerprint "line endings" 116 and "branches" 117 are detected by the fingerprint sensor 102, as shown in FIG. 6, and compared to a stored pattern. Because the locations of these structures are unique to each individual, the comparison can determine with statistical certainty whether the patterns match. The sensor 102 then provides an authentication signal that depends on whether the applied fingerprint matches the stored pattern.

Each ridge detector 140 on the fingerprint sensor 102 also has a small processor connected to it. These processors are connected to each other to form a parallel processing network that can detect the locations of line endings 116 and line branches 117 from the initial patterns detected by the ridge detectors 140. A parallel processing operation, implemented with the controller 106, can perform the following functions on the fingerprint image gathered by the fingerprint sensor 102: First, reduction of the light and dark patterns (one and zero) in the print to lines that have a width of only one pixel; Second, identification of the pixels that have exactly one active nearest neighbor (line endings 116) and exactly three active nearest neighbors (line branches 117); third, re-definition of the pattern of line endings 116 and branches 117 to a form that is independent of position and rotation; fourth, correlation of the resulting data with a pre-stored target fingerprint to determine matching probability.

Figure 7:
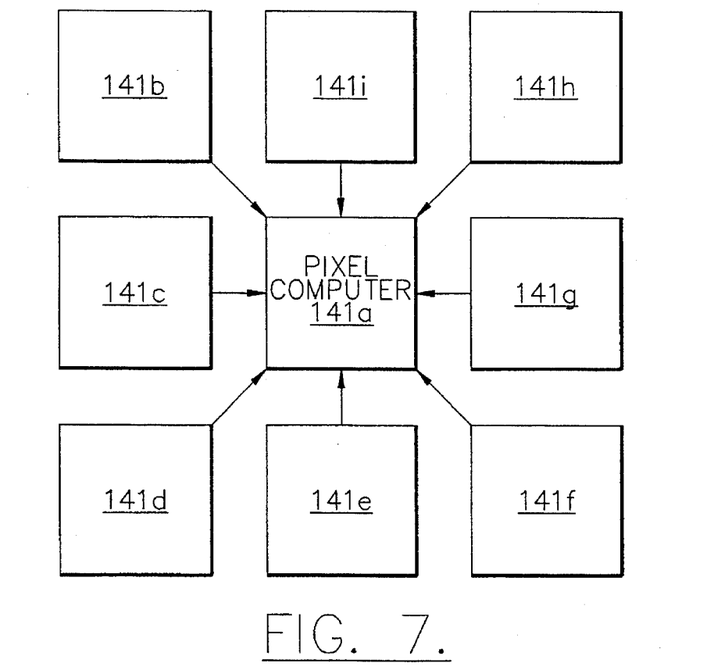
FIG. 7 illustrates a pixel computer according to the invention.

A pixel computer 141 located at each pixel and in communication with each nearest neighbor pixel can be designed to perform both the first and second functions described above. Such a pixel computer 141a is shown in FIG. 7, along with its connections to neighbors, 141b–141i. At this point, it is assumed that the capture of the fingerprint sensor image has been completed and that each pixel has stored a result appropriate to this measurement, either a one or zero.

Figure 8:
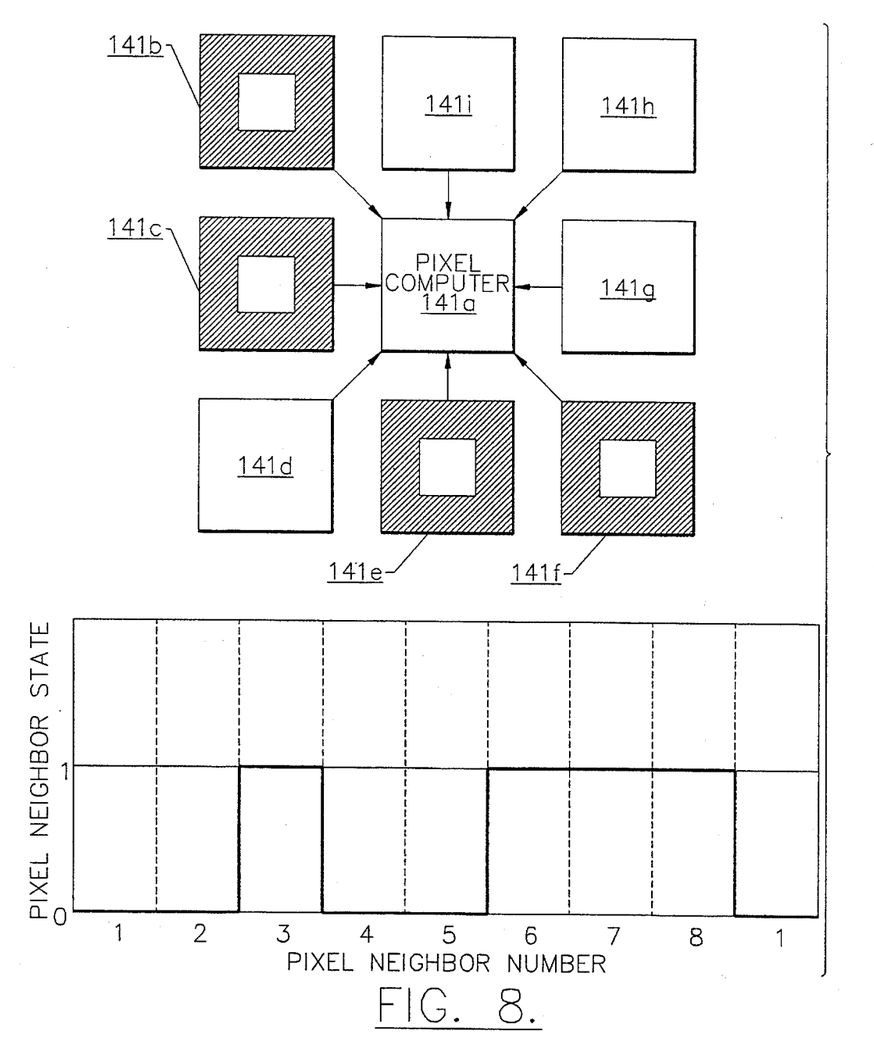
FIG. 8 illustrates a "waveform" generated by a pixel computer.

The function of the pixel computer 141 is to scan in order each neighbor around the pixel, forming a "pulse" train waveform from the values detected at each neighbor. For example, in FIG. 8 the stored values of the pixels are represented by black squares (representing zero) or white squares (representing one). After the formation and storage of the pulse train, the pulses are counted and an operation is performed on the center pixel depending on the state of the center pixel and the result of counting the pulses. The locations of the line branches 117 and endings 116 in the fingerprint data can then be computed.

A model of the system has been tested on real and simulated fingerprint data and shown to provide the desired operational characteristics for the fingerprint sensor 102.

Figure 9:
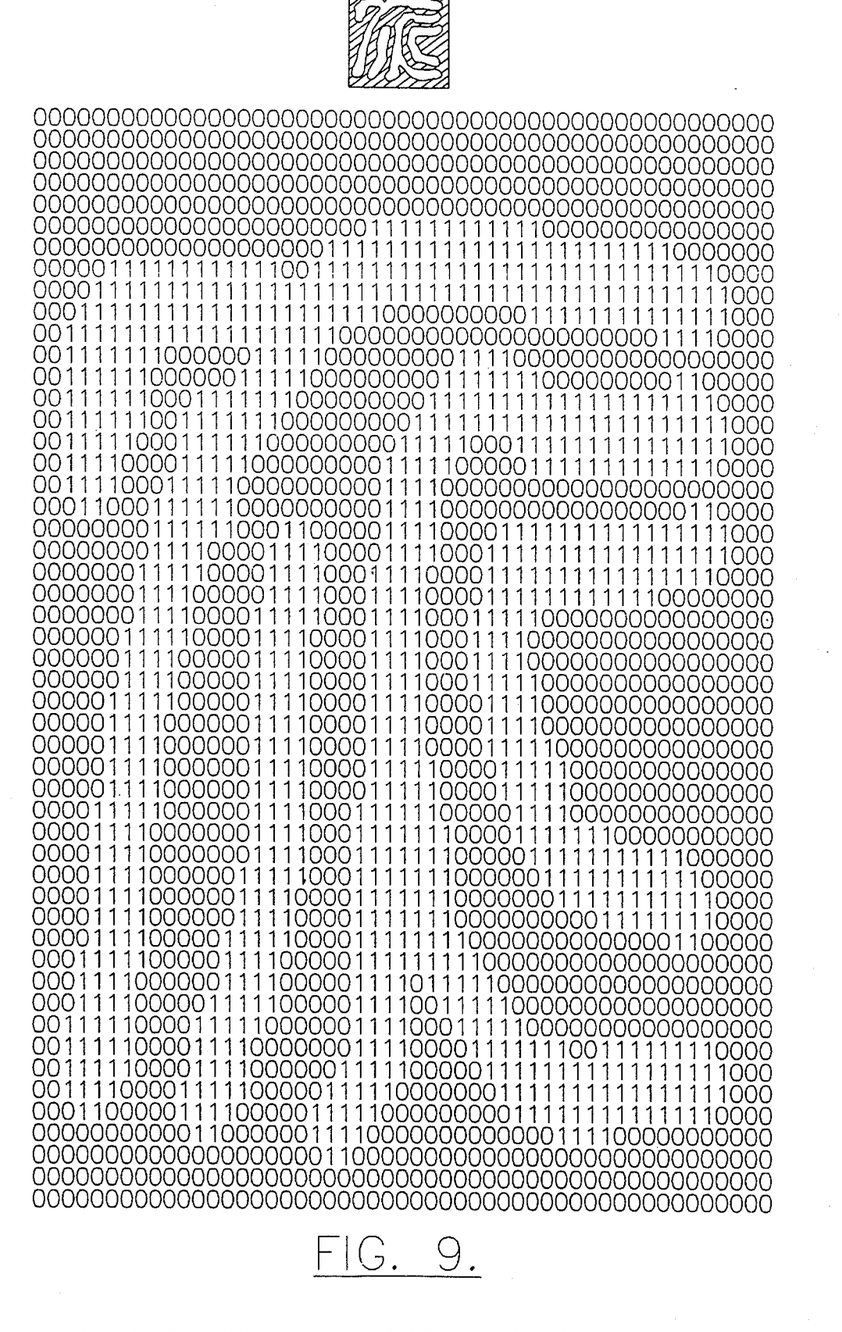
FIG. 9 illustrates simulated fingerprint data including line endings and branches.

Results from this system will be used to demonstrate the operations described above. FIG. 9 illustrates a simulated data capture of lines including branches 117 and endings 116. The figure shows the image of the data and the binary representation of the data as taken from the sensing array. One difficulty in determining exactly where a branch 117 occurs is determining the width of the lines representing the fingerprint ridges. The first step in the recognition process is to reduce the widths of the ridge lines to a single pixel, after which, branch points and end points are unambiguously defined.

Figure 10:
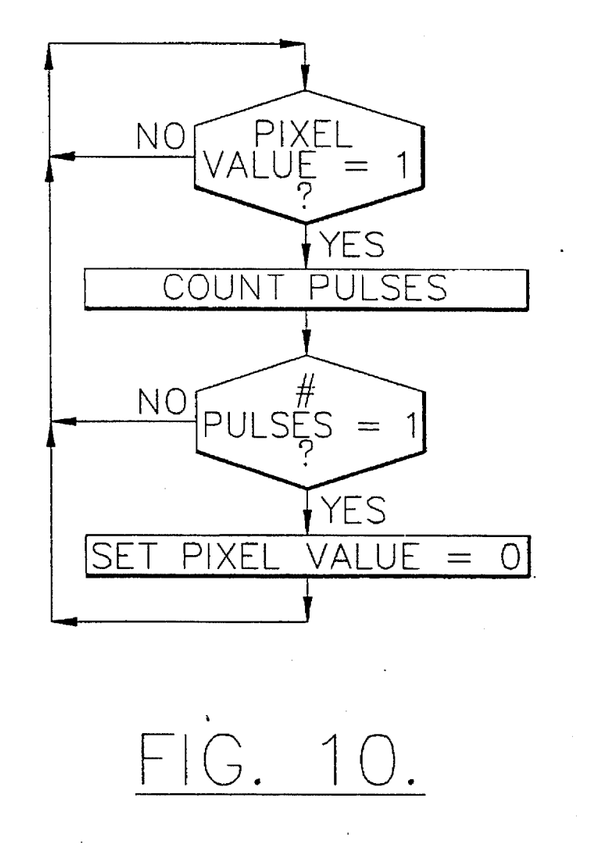
FIG. 10 is a flowchart illustrating operations of the pixel computer of FIG. 7.
Figure 11:
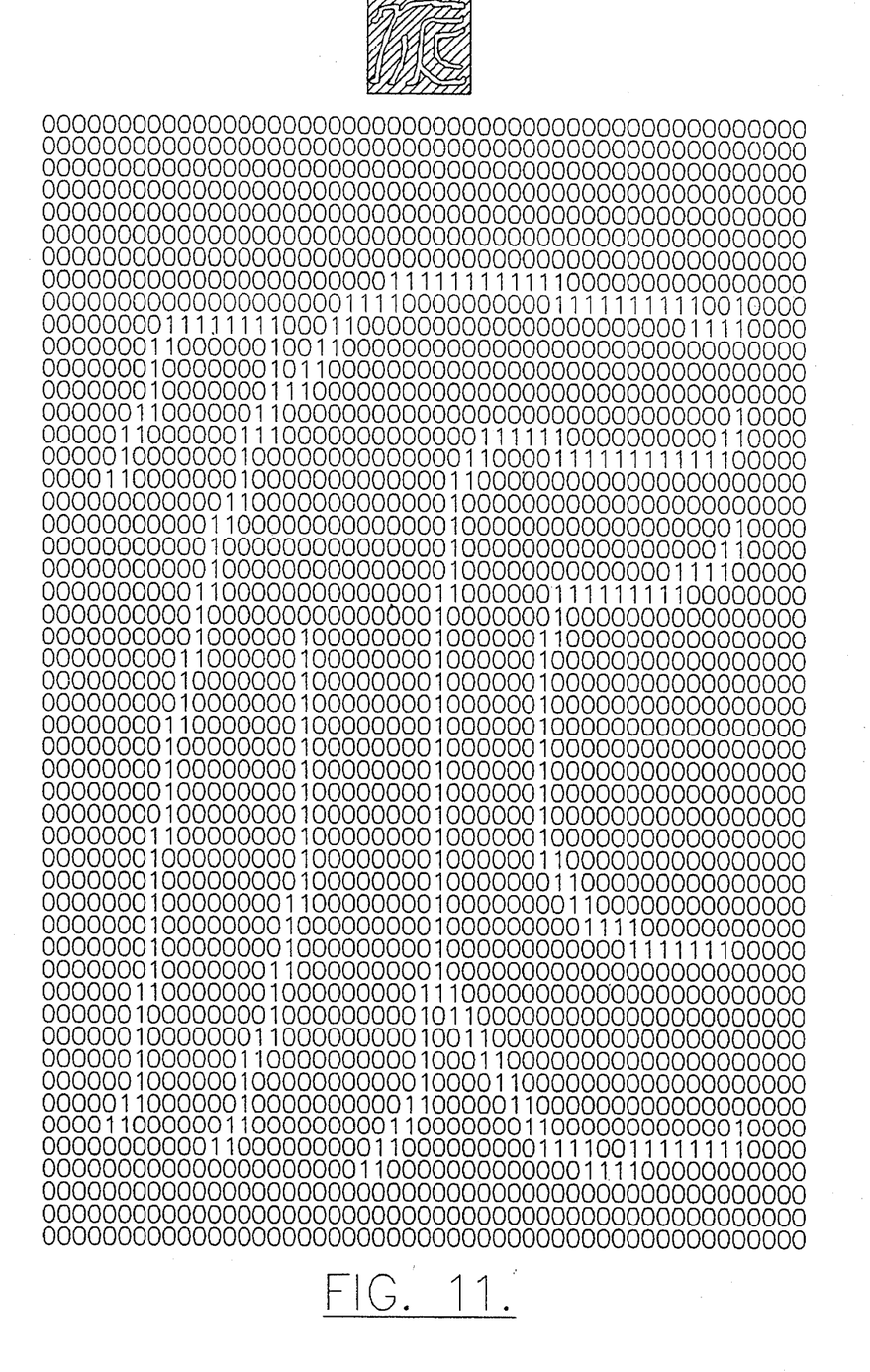
FIG. 11 illustrates the outcome of manipulating the data illustrated in FIG. 9 by the operations illustrated in FIG. 10.

To accomplish the width reduction, the operations illustrated by FIG. 10 are performed by the pixel computer 141 of every pixel. Execution of these operations reduce the widths of the ridge lines to one pixel width at most, since the only pixels that will count one pulse are those on the boundaries of lines thicker than one pixel. FIG. 11 illustrates the results of such an operation on the data presented in FIG. 9. Note that the lines have been reduced to at most one pixel width. Once the line widths are equal to one pixel, the branches 117 and endings 116 may be identified by the results of the pulse count for each pixel.

Figure 12A:
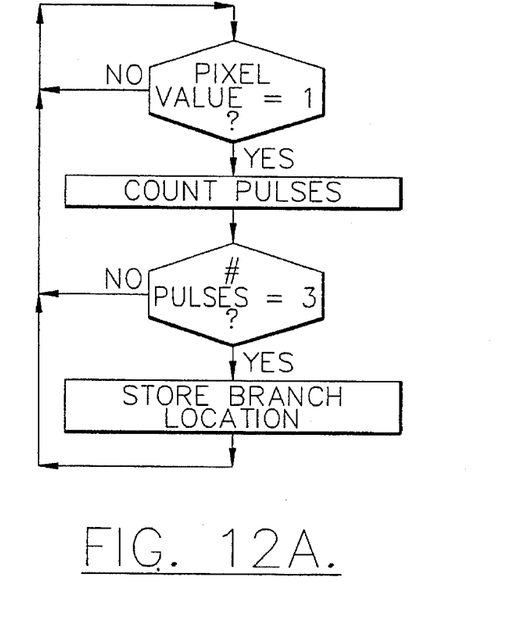
FIGS. 12A and 12B are flowcharts illustrating operations of a pixel computer for determining the locations of "line endings" and "branches".
Figure 12B:
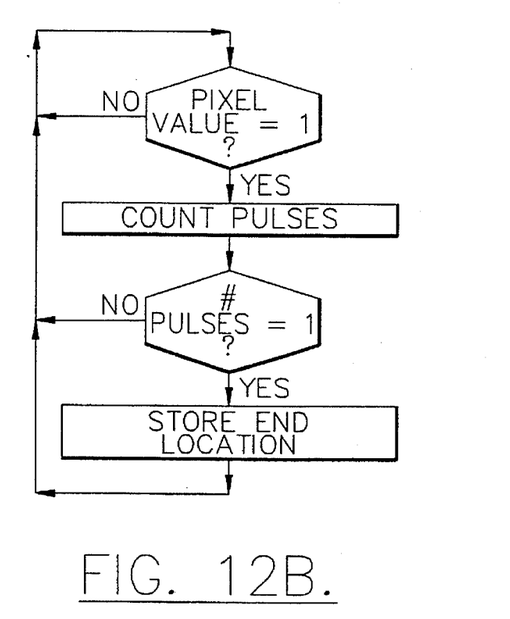
Figure 13:
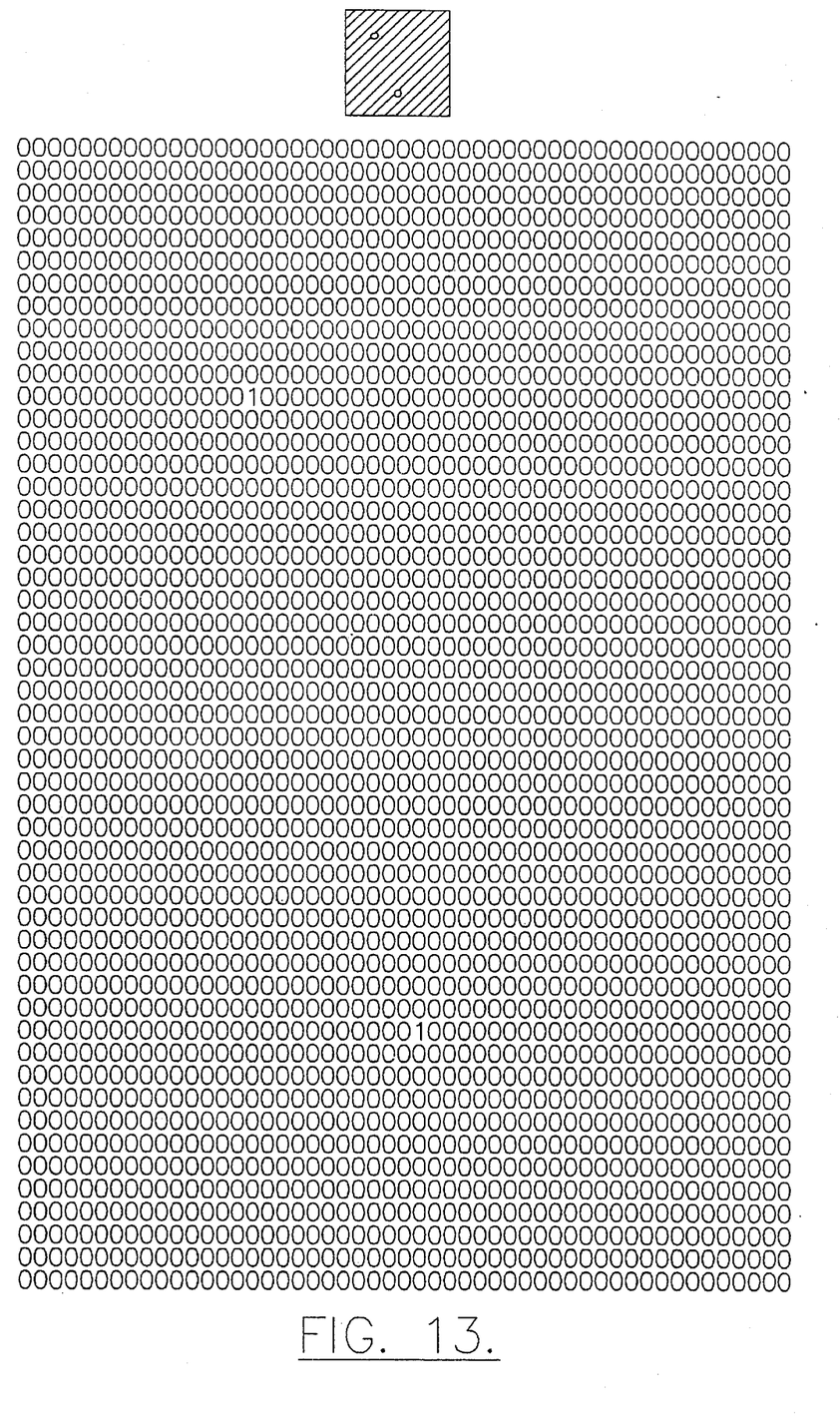
FIG. 13 illustrates the locations of branches found after manipulating the simulated data shown in FIG. 11 under the operations illustrated in FIG. 12.

After the line reduction, the operations illustrated by FIGS. 12A and 12B are performed by the pixel computers 141. FIG. 12A illustrates a set of operations used to determine line branch 117 locations, and FIG. 12B illustrates a set of operations used to determine line ending 116 locations. FIG. 13 illustrates the locations of branches 117 for the data set presented in FIG. 9. Note that the two branch locations are correctly identified. It will be understood that the fingerprint comparison may be performed by controller 106 of FIG. 2.

Figure 14:
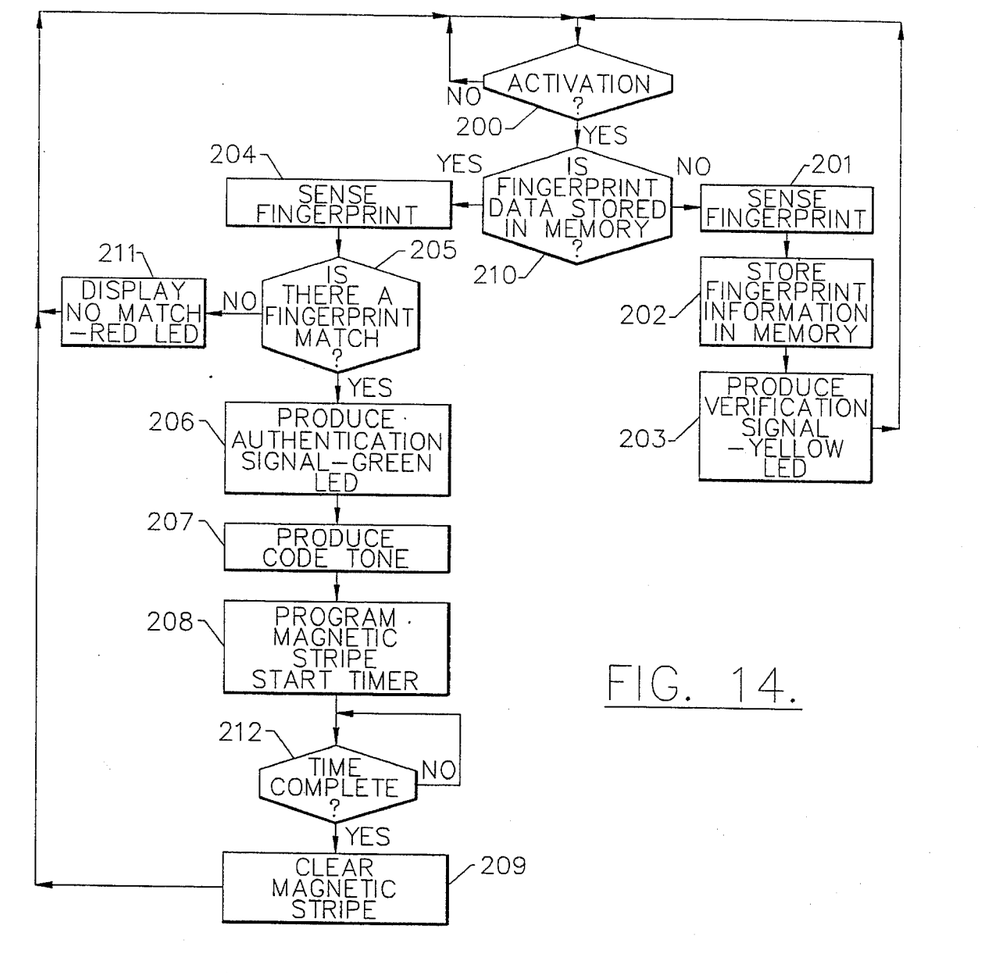
FIG. 14 is a flow chart illustrating a method of using a self-authenticating ID card according to the invention.

A preferred method of operating an identification card 100 according to the invention is illustrated by the flow diagram of FIG. 14. After activation 200, the information related to a fingerprint which is impressed upon the identification card's fingerprint sensor 102 is sensed at Block 201. Then the information related to the sensed fingerprint is electronically stored at Block 202. A verification signal, indicating that the sensed fingerprint information has been successfully electronically stored, is produced at Block 203. The step 203 of producing a verification signal may comprise displaying a visual verification signal, e.g. energizing a yellow LED 105A, or generating an audible verification signal.

An alternative method of using a self-authenticating ID card 100 may involve the operation of electronically storing information relating to a fingerprint by other than the holder. For example, a central processing station, or fingerprint kiosk, might be used to record and load identification cards 100. As shown by Block 210, the controller 106 recognizes if fingerprint data is stored in memory. In any event, after the reference fingerprint information is stored, the fingerprint sensor 102 can sense information related to a second fingerprint which is impressed upon the identification card, as indicated by Block 204. The term "second fingerprint" is meant to include any fingerprint sensing which occurs after the initial fingerprint storage, or loading of fingerprint information, into the card's memory 103. As shown by Block 205, the information related to the second fingerprint may then be compared with the information related to the electronically stored fingerprint. An authentication signal is then produced if the information related to the second fingerprint matches the electronically stored fingerprint information, as indicated by Block 206. If the sensed fingerprint information does not match the stored fingerprint information, then, as shown by Block 211, a red LED 105C may be energized to indicate that no match has occurred.

The step 206 of producing an authentication signal can include a visual authentication signal e.g. energizing a green LED 105B, or generating an audible authentication signal, as shown by Block 207. The generating of an audible authentication signal preferably includes audibly transmitting a predetermined coded audio signal. For a higher level of security, the coded tone may be made up of a combination of quarter notes of one or more octaves. For example, one octave, which has 32 quarter notes, will produce $32^{32}$ tones when combined with another octave. Following an affirmative authentication signal, predetermined account information is loaded into the programmable magnetic stripe 109 on the identification card 100, as shown by Block 208. Then, as indicated by Blocks 212 and 209, account information is cleared from the programmable magnetic stripe after a predetermined elapsed time.

Figure 15:
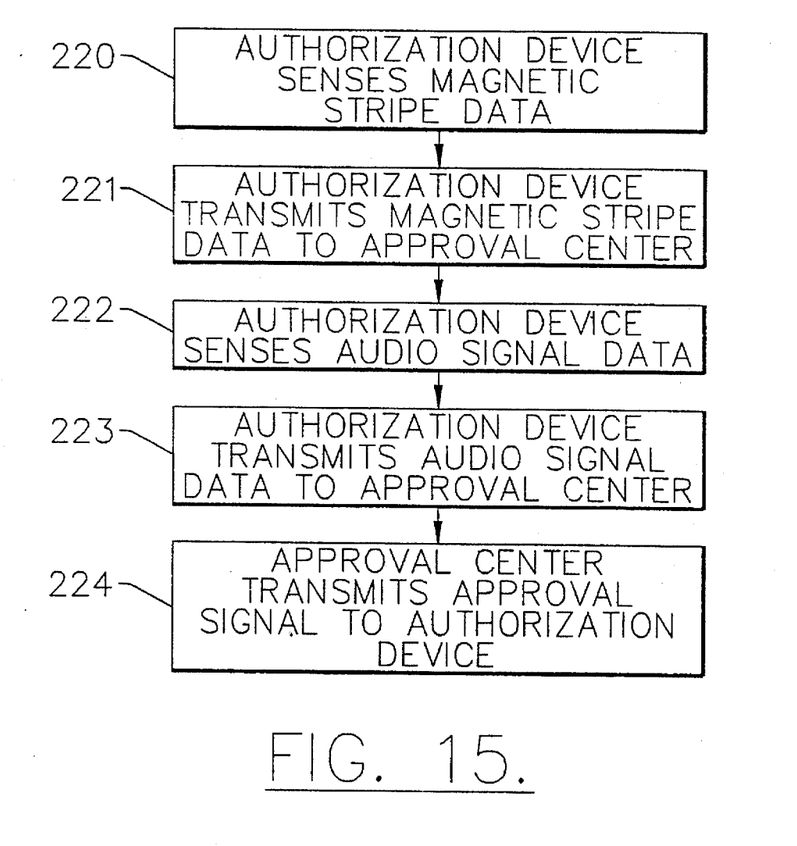
FIG. 15 is a flow chart illustrating a method of approving a self-authenticating ID card according to the invention for a transaction.

Referring now to FIG. 15, operations for approving a self-authenticating ID card by an approval center 125 using an identification card authorization device 120 begin by sensing magnetic stripe data from a self-authenticating ID card 100, at Block 220. Then, as indicated by Block 221, the data sensed from the magnetic stripe on the identification card 100 is transmitted from the identification card authorization device 120 to an approval center 125. Either before, after, or simultaneously to the magnetic sensing, audio signals are sensed from the self-authenticating ID card 100 using the identification card authorization device 120, as shown by Block 222. In a subsequent step, as represented by Block 223, the authorization device transmits electronic or audio signals containing the audio data from the identification card authorization device 120 to the approval center 125. Finally, a signal approving a transaction may be transmitted from the approval center 125 to the identification card authorization device 120, as indicated by Block 224.

Thus, the invention allows the encoding of one's fingerprint onto an identification card 100 in an uncomplicated fashion. At a subsequent point in time, the card 100 can recognize the stored fingerprint in order to ensure that only a rightful holder uses the card 100. As an example, when a person receives their credit card, he may be instructed to remove a shield that covers the fingerprint sensor 102 encoding/recognition area of the card 100. When the shield is removed, the controller 106 in the card is preferably activated for a specific period of time, e.g. one minute, allowing the card holder to encode one or more fingerprints. When the fingerprint sensor 102 is pressed, a yellow LED 105A will be activated. When the yellow LED 105A is deactivated, the permanent sensing of that holder's fingerprint(s) is complete. In other words, once the encoding time lapses, no additional encodings can be made. When the owner again activates or presses the same finger on the fingerprint sensor 102, a green LED 105B will light, indicating a match. Any other fingerprint will trigger a red LED 105C, indicating that no match has occurred.

The card holder may then be instructed to call an 800 number. A card owner will be asked their name, type of card, the card number and other pertinent information. The card owner will be instructed to hold the card next to a telephone mouthpiece and to press their fingerprint onto the fingerprint sensor 102. If the proper holder is performing this action, the card 100 will emit a unique tone, stored in audio generator 108, that will match a similar tone that was pre-loaded into the authorization center. The unique tone may correspond to the data on the magnetic stripe 109. Later, when the proper fingerprint is pressed onto the fingerprint sensor 102, not only will the green LED 105B be activated, but a coded tone will also be emitted that will identify the correct owner.

Thus, a self-authenticating ID card 100 according to the invention authenticates a holder with a high degree of accuracy and security.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. An identification card for a card user comprising:

a substrate;

fingerprint sensing means, carried by the substrate, for sensing information related to a fingerprint;

memory means internal to said substrate and electrically connected to said fingerprint sensing means, for storing information related to a fingerprint of the card user;

activation means, electrically connected to said fingerprint sensing means and said internal memory means, for initiating internal storage of the information related to a fingerprint of the card user upon activation thereof for a first time;

controller means internal to said substrate and responsive to said activation means, for independently programming said internal memory means with the information related to a fingerprint of the card user by generating an internal control signal to initiate transfer of the information related to a fingerprint of the card user to said internal memory means for storage therein, upon activation of said activation means for the first time;

verification means, electrically connected to said internal memory means, for indicating that the information related to a fingerprint of the card user has been successfully stored in said internal memory means upon activation of said activation means for the first time; and authentication means, responsive to said fingerprint sensing means, said internal memory means and said activation means, for comparing information related to a sensed fingerprint with the stored fingerprint information of the card user and for producing an authentication signal if the sensed fingerprint information matches the stored fingerprint information of the card user.

2. An identification card according to claim 1 wherein said verification means comprises a visual display for visually indicating that the information related to a fingerprint of the identification card user has been successfully stored in said memory means.

3. An identification card according to claim 1 wherein said verification means comprises a speaker for audibly indicating that the information related to a fingerprint of the identification card user has been successfully stored in said memory means.

4. An identification card according to claim 1 further comprising a visual display, responsive to said authentication signal, for visually indicating that the sensed fingerprint information matches the stored fingerprint information.

5. An identification card according to claim 1 further comprising a speaker, responsive to said authentication signal, for audibly indicating that the sensed fingerprint information matches the stored fingerprint information.

6. An identification card according to claim 5 further comprising audio generating means, electrically coupled to said speaker and responsive to said authentication signal, for transmitting a predetermined audio signal to said speaker if the sensed fingerprint information matches the stored fingerprint information.

7. An identification card according to claim 1 further comprising second memory means an said substrate for storing account information related to the card user.

8. An identification card according to claim 7 wherein the second memory means is a programmable magnetic stripe, the card further comprising:

magnetic stripe programming means, coupled to said programmable magnetic stripe and responsive to said authentication signal, for loading predetermined account information into said programmable magnetic stripe if the sensed fingerprint information matches the stored fingerprint information.

9. An identification card according to claim 8 further comprising clearing means for automatically clearing account information from said programmable magnetic stripe after a predetermined elapsed time.

10. A self-authenticating identification card for a card user comprising:

a substrate;

fingerprint sensing means, carried by the substrate, for sensing information related to a fingerprint;

memory means internal to said substrate and electrically connected to said fingerprint sensing means, for internally storing information related to a fingerprint of the card user;

activation means, responsive to said fingerprint sensing means, for initiating internal storage of the information related to a fingerprint of the card user upon activation thereof;

controller means internal to said substrate and responsive to said activation means, for independently programming said internal memory means with the information related to a fingerprint of the card user by generating an internal control signal to initiate transfer of the information related to a fingerprint of the card user to said internal memory means for storage therein upon activation of said activation means; and authentication means, electrically connected to said fingerprint sensing means and said internal memory means, for comparing information related to a sensed fingerprint with the stored fingerprint information of the card user in said internal memory means, and for producing an authentication signal if the sensed fingerprint information matches the stored fingerprint information.

11. An identification card according to claim 10 further comprising a visual display, responsive to said authentication signal, for visually indicating that the sensed fingerprint information matches the stored fingerprint information.

12. An identification card according to claim 10 further comprising a speaker, responsive to said authentication signal, for audibly indicating that the sensed fingerprint information matches the stored fingerprint information.

13. An identification card according to claim 12 further comprising audio generating means, electrically coupled to said speaker and responsive to said authentication signal, for transmitting a predetermined audio signal to said speaker if the sensed fingerprint information matches the stored fingerprint information.

14. An identification card according to claim 10 further comprising second memory means on said substrate for storing account information related to the card user.

15. An identification card according to claim 14 wherein the second memory means is a programmable magnetic stripe, the card further comprising:

magnetic stripe programming means, coupled to said programmable magnetic stripe and responsive to said authentication signal, for loading predetermined account information into said programmable magnetic stripe if the sensed fingerprint information matches the stored fingerprint information.

16. An identification card according to claim 15 further comprising clearing means for automatically clearing account information from said programmable magnetic stripe after a predetermined elapsed time.

17. A method of using an identification card comprising the steps of:

sensing information related to a fingerprint which is impressed upon a fingerprint sensor of the identification card;

independently generating at least one control signal internal to the identification card to transfer the sensed fingerprint information internally from the fingerprint sensor to an internal identification card memory and electronically store the sensed fingerprint information in the internal identification card memory; and producing a verification signal indicating that the sensed fingerprint information has been successfully electronically stored in the internal identification card memory.

18. A method according to claim 17 wherein the step of producing a verification signal comprises the step of displaying a visual verification signal on the card for indicating that the sensed fingerprint information has been successfully electronically stored in the internal identification card memory.

19. A method according to claim 17 wherein the step of producing a verification signal comprises the step of generating an audible verification signal on the card for indicating that the sensed fingerprint information has been successfully electronically stored in the internal identification card memory.

20. A method according to claim 17 further comprising the steps of:

sensing information related to a second fingerprint which is impressed upon the fingerprint sensor of the identification card;

comparing the information related to the second fingerprint with the information related to the electronically stored fingerprint which is stored in the internal identification card memory; and producing an authentication signal on the card if the information related to the second fingerprint matches the electronically stored fingerprint information.

21. A method according to claim 20 wherein the step of producing an authentication signal comprises the step of displaying a visual authentication signal on the card if the information related to the second fingerprint matches the electronically stored fingerprint information.

22. A method according to claim 20 wherein the step of producing an authentication signal comprises the step of generating an audible authentication signal on the card if the information related to the second fingerprint matches the electronically stored fingerprint information.

23. A method according to claim 22 wherein the step of generating an audible authentication signal comprises the step of audibly transmitting a predetermined coded audio signal from the card if the information related to the second fingerprint matches the electronically stored fingerprint information.

24. A method according to claim 20 wherein the step of producing an authentication signal is followed by the step of loading predetermined account information into a programmable magnetic stripe on the identification card if the information related to the second fingerprint matches the electronically stored fingerprint information on the card.

25. A method according to claim 24 further comprising the step of clearing account information from the programmable magnetic stripe after a predetermined elapsed time.

26. A self-authenticating identification card for a card user comprising:

a substrate;

a programmable magnetic stripe on said substrate;

fingerprint sensing means, carried by said substrate, for sensing information related to a fingerprint;

memory means internal to said substrate and electrically connected to said fingerprint sensing means, for storing information related to a fingerprint of the card user;

activation means, electrically connected to said fingerprint sensing means and said internal memory means, for initiating internal storage of the information related to a fingerprint upon activation thereof;

controller means internal to said substrate and responsive to said activation means, for independently programming said internal memory means with the information related to a fingerprint by generating a control signal internal to said substrate to control transfer of the information related to a fingerprint to said internal memory means for storage therein, upon activation of said activation means;

verification means, electrically connected to said internal memory means, for indicating that the information related to a fingerprint of the card user has been successfully stored in said internal memory means upon said activation of said activation means;

authentication means, responsive to said fingerprint sensing means, said internal memory means and said activation means, for comparing information related to a sensed fingerprint with the stored fingerprint information of the card user and for producing an authentication signal if the sensed fingerprint information matches the stored fingerprint information; and magnetic stripe programming means, carried by said substrate and electrically connected to said programmable magnetic stripe and responsive to said authentication signal, for loading predetermined account information into said programmable magnetic stripe if the sensed fingerprint information matches the stored fingerprint information and for clearing account information from said programmable magnetic stripe after a predetermined elapsed time.

27. An identification card according to claim 26 wherein said verification means comprises a visual display for visually indicating that the information related to the fingerprint of the identification card user has been successfully stored in said memory means and for visually indicating that the sensed fingerprint information matches the stored fingerprint information.

28. An identification card according to claim 26 wherein said verification means further comprises a speaker for audibly indicating that the information related to a fingerprint of the identification card user has been successfully stored in said memory means and for audibly indicating that the sensed fingerprint information matches the stored fingerprint information.

29. An identification card according to claim 28 further comprising audio generating means, electrically connected to said speaker and responsive to said authentication signal, for transmitting a predetermined audio signal to said speaker if the sensed fingerprint information matches the stored fingerprint information.

* * * * *